United States Patent
Mathew et al.

(10) Patent No.: US 8,485,367 B2
(45) Date of Patent: Jul. 16, 2013

(54) FLUID FILTRATION APPARATUS FOR APPLIANCES

(75) Inventors: Paul Mathew, Bangalore (IN); Ramasamy Thiyagarajan, Louisville, KY (US); Nikhil Subhashchandra Tambe, Bangalore (IN)

(73) Assignee: General Electric Company, Niskayuna, NY (US)

( * ) Notice: Subject to any disclaimer, the term of this patent is extended or adjusted under 35 U.S.C. 154(b) by 518 days.

(21) Appl. No.: 12/789,745

(22) Filed: May 28, 2010

(65) Prior Publication Data

US 2011/0290719 A1    Dec. 1, 2011

(51) Int. Cl.
*B01D 21/26* (2006.01)
*B01D 17/038* (2006.01)
*C02F 1/38* (2006.01)

(52) U.S. Cl.
USPC ........................................ 210/512.3; 134/109

(58) Field of Classification Search
USPC ........................................ 210/512.3; 134/109
See application file for complete search history.

(56) References Cited

U.S. PATENT DOCUMENTS

| | | | |
|---|---|---|---|
| 4,702,837 A | * | 10/1987 | Lecoffre et al. ............ 210/512.3 |
| 6,343,611 B1 | | 2/2002 | El-Shoubary et al. |
| 6,398,877 B1 | | 6/2002 | Magliocca |
| 6,458,281 B2 | | 10/2002 | Magnoff |
| 2008/0116135 A1 | | 5/2008 | Rieger et al. |
| 2009/0008342 A1 | * | 1/2009 | Nilsen et al. .................. 210/788 |

* cited by examiner

*Primary Examiner* — David A Reifsnyder
(74) *Attorney, Agent, or Firm* — Mary Louise Stanford

(57) ABSTRACT

Embodiments, presented herein are directed to a filtration system including an outer pipe, an inner pipe and a stirrer. The outer pipe is configured to receive a working fluid from a filter inlet. The outer pipe includes a venturi neck and an outer channel. The venturi neck is located downstream of the filter inlet. The outlet channel is located downstream of the venturi neck, wherein the outlet channel is configured to provide an outlet for a first type of impurity. The inner pipe is co-axially positioned with the outer pipe, wherein the inner pipe is configured to receive a second type of impurity. The stirrer is positioned inside the outer pipe, wherein the stirrer rotates with the inner pipe to substantially separate at least the first and the second types of impurities from the working fluid.

19 Claims, 3 Drawing Sheets

FLUID FILTRATION APPARATUS FOR APPLIANCES

BACKGROUND

Embodiments presented herein relate to filtration of impurities from fluid and more particularly, to a filtration apparatus for separating solid and liquid impurities from fluid.

Filtration apparatus for separating solid and liquid impurities from fluids used in household appliances have been well known for many years. For example, household appliances such as dishwasher utilizes water for cleaning utensils, leaving the used water impure due to added impurities such as solid food particles, suspended dirt particles, oil, etc. Some appliances also perform filtration of the used water containing impurities to reuse the water in the next cycle or to use less number of fills per cycle. This ensures continuous supply of water for the household appliance while saving water.

Typically, household appliances have a filter arrangement to filter impurities from used water to prevent such impurities from re-depositing on articles being washed. Many appliances have at least one filter interposed between a tub sump and circulation pumps used in the appliance. Moreover, some appliances are also known to have a bypass filter arrangement, such as a flow-through filtration system, which may be independent of the circulation pump, to filter wash liquid upstream of the circulation pump.

However, flow-through filtration systems may require periodic removal of filter screens for cleaning by the user. Further, users are expected to remove, clean and properly reinstall filter components on a regular basis. However, problems may occur when a consumer fails to replace the filters properly before a new wash cycle. For example, dishwasher spray may get plugged with debris, which may cause significant efficiency degradation. Further, a degree of filtration of the water in the present filtration system may reduce with time as the filters become more and more saturated with impurities.

Therefore there is a need for a filtration system for separating solid and liquid impurities that does not require frequent component replacement.

BRIEF DESCRIPTION OF THE FIGURES

For a more complete understanding of the various embodiments, and the advantages thereof, reference is now made to the following descriptions taken in conjunction with the accompanying drawings, in which.

BRIEF DESCRIPTION

Figure 1:
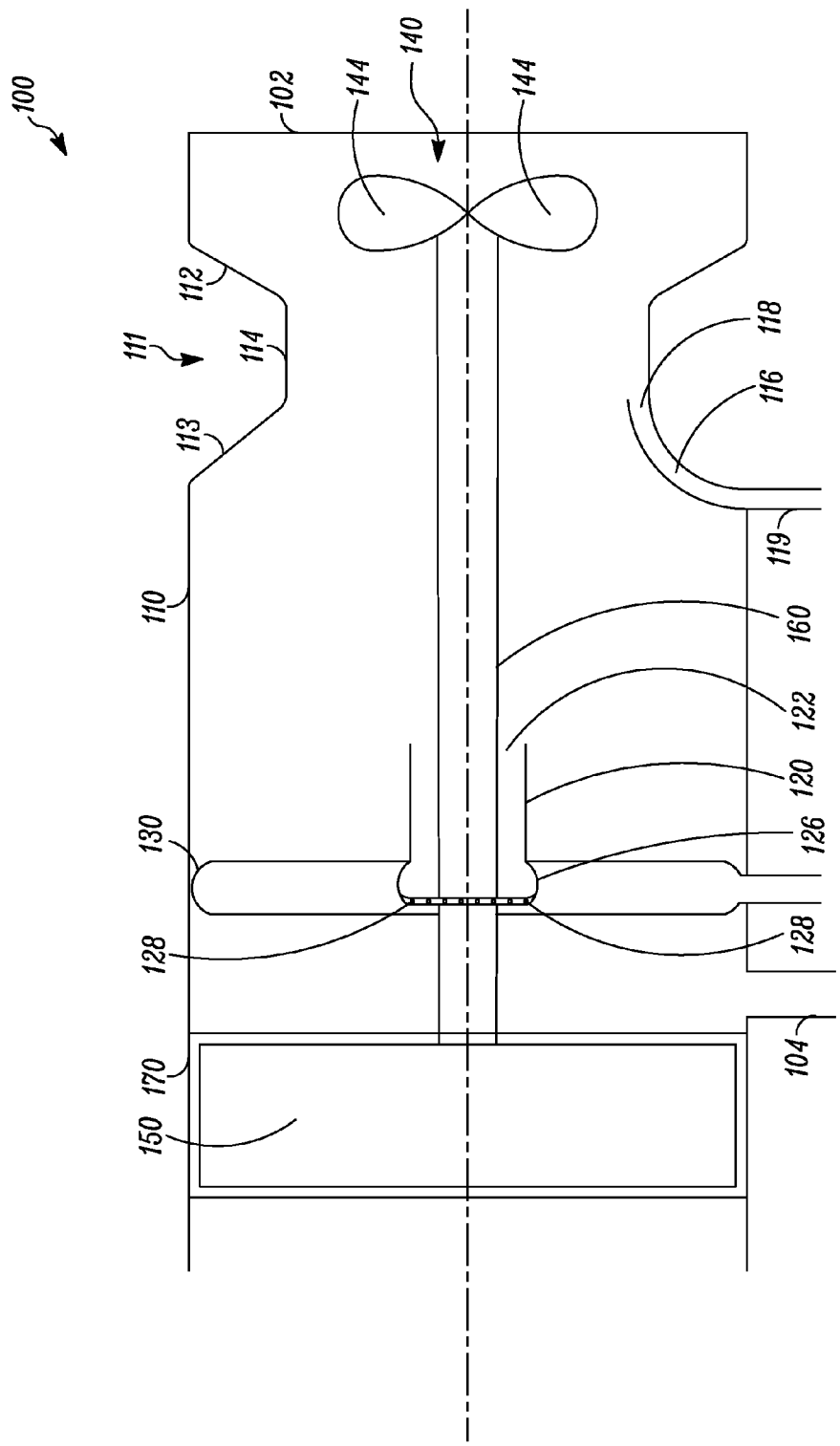
FIG. 1 illustrates a sectional view of the filtration system, according to an embodiment.

Embodiments, presented herein are directed to a filtration system including an outer pipe, an inner pipe and a stirrer. The outer pipe is configured to receive a working fluid from a filter inlet. The outer pipe includes a venturi neck and an outer channel. The venturi neck is located downstream of the filter inlet. The outlet channel is located downstream of the venturi neck, wherein the outlet channel is configured to provide an outlet for a first type of impurity. The inner pipe is co-axially positioned with the outer pipe, wherein the inner pipe is configured to receive a second type of impurity. The stirrer is positioned inside the outer pipe, wherein the stirrer rotates with the inner pipe to substantially separate at least the first and the second types of impurities from the working fluid.

DETAILED DESCRIPTION

Various embodiments will be described more fully hereinafter with reference to the accompanying drawings. Such embodiments should not be construed as limiting. For example, one or more aspects can be utilized in other embodiments and even other types of devices. In the drawings, like numbers refer to like elements.

In the following description, specific details are set forth such as specific quantities, sizes, etc. so as to provide a thorough understanding of embodiments. However, the embodiments presented herein may be practiced without such specific details also. In many cases, details concerning such considerations and the like have been omitted inasmuch as such details are not necessary to obtain a complete understanding of the various embodiments and are within the skills of persons of ordinary skill in the relevant art.

Referring to the drawings in general, it will be understood that the illustrations are for the purpose of describing particular embodiments and are not intended to be limiting.

FIG. 1 illustrates a sectional view of a filtration system 100, according to an exemplary embodiment. Though the filtration system 100 is shown to be utilized in a dishwasher in the exemplary embodiment, the filtration system 100 may be utilized in water purifiers, washing machines and other industrial and household appliances. In addition, any suitable size, shape or type of elements or materials could be used. In an embodiment, the filtration system 100 may be utilized in the dishwasher to filter impurities such as oil, dirt and food particles from a working fluid, and thereby providing filtered working fluid to be used in the next washing cycle. Examples of the working fluid may include water, water mixed with any cleansing material (E.g. soap, detergent etc.), foam, gel and the like.

After a washing cycle is completed in the dishwasher, the working fluid may be fed from a drain outlet (not shown) of the dishwasher (also referred to as 'appliance') to a filter inlet 102. In an embodiment, the filter inlet 102 may be configured in a straight line with respect to the drain outlet such that filter inlet 102 is exposed to the working fluid flowing from the drain outlet. In another embodiment, the filter inlet 102 may be configured substantially perpendicular to the drain outlet. However, various other configurations of the drain outlet and the filter inlet 102 may be utilized.

Thereafter, the working fluid may be filtered in the filtration system 100 and various impurities may be taken out through multiple openings (described in conjunction with FIGS. 1-3) provided in the filtration system. After the impurities are expelled from the working fluid, the filtered working fluid may flow out through a filter outlet 104. In an embodiment, the filter outlet 104 may be configured substantially perpendicular to the filter inlet 102. In another embodiment, the filter outlet 104 may be configured in a straight line with respect to the filter inlet 102. The filtered working fluid may be then fed to a circulation pump to feed the filtered working fluid to the appliance for utilization in the next washing cycle. In an embodiment, the filtration system 100 may include an outlet flow valve (not shown) installed at the filter outlet 104 to avoid backward flow of the working fluid into the filtration system 100.

As shown in FIG. 1, the filtration system 100 may include an outer pipe 110. In an embodiment, the outer pipe 110 may include a venturi neck 111 located downstream of the filter inlet 102. The venturi neck 111 may provide a constricted path to the working fluid, thereby resulting in an increase in a flow velocity of the working fluid through the outer pipe 110 and a consequent drop in pressure of the working fluid. In an embodiment, the outer pipe 110 may include a converging section 112, a diverging section 113, and a transition section 114. As shown in FIG. 1, a radius of the transition section 114 may be less than a radius of the outer pipe 110. In an embodiment, the radius of transition section 114 may be about half of the radius of the outer pipe 110. In an embodiment, the venturi neck 111 may have the transition section 114 with a pre-defined radius of curvature. In another embodiment, the transition section 114 may be substantially planar. In yet another embodiment, the transition section 114 may not be present in the venturi neck 111. Further, shape of the venturi neck 111 enables churning of the working fluid thereby aiding in separation of the first type and the second type of impurities from the working fluid due to centrifugal force acting on the working fluid as the working fluid comes out of the diverging section 113. The venturi neck 111 as depicted in FIG. 1 is for exemplary purposes only. The venturi neck 111 may be formed in various other shapes and dimensions.

As shown in FIG. 1, the outer pipe 110 includes an outlet channel 116 located downstream of the venturi neck 111. The outlet channel 116 may be configured to provide an outlet for a first type of impurity having a first density. In an embodiment, the first type of impurity may have a density more than the density of the working fluid. In a further embodiment, the first type of impurity may be substantially in a solid state. An outlet channel opening 118 of the outlet channel 116 may be oriented at a pre-defined angle with respect to flow of the working fluid (as shown in FIG. 1). The orientation of the outlet channel opening 118 enables the outlet channel 116 to receive the first type of impurity. In an embodiment, the outlet channel 116 may be an integral part of the outer pipe 110. The outer pipe 110 may include a first opening 119 configured to provide an opening for the outlet channel 116 to expel the first type of impurity.

In an embodiment, an inner pipe 120 may be co-axially positioned with respect to the outer pipe 110. The inner pipe 120 may be configured to receive a second type of impurity having a second density through an inner pipe inlet 122. In an embodiment, the second type of impurity has a density lesser than the density of the working fluid. In a further embodiment, the second type of impurity may be substantially in a liquid state. In a yet another embodiment, the second type of impurity may substantially include oil.

As shown in FIG. 1, the inner pipe 120 may include a collection chamber 126 configured to receive the second type of impurity. The collection chamber 126 may be a hollow enclosure configured on the inner pipe 120 substantially downstream of the inner pipe inlet 122. As shown in FIG. 1, the collection chamber 126 may include holes 128 positioned circumferentially on the collection chamber 126. Further, the filtration system 100 may include a tubular chamber 130 that substantially encases the collection chamber 126. The tubular chamber 130 may receive the second type of impurity via the holes 128 of the collection chamber 126.

As shown in FIG. 1, the filtration system 100 may further include a stirrer 140 positioned inside the outer pipe 110. In an embodiment, the stirrer 140 may be positioned downstream of the venturi neck 111. In another embodiment, the stirrer 140 may be positioned upstream of the venturi neck 111. The stirrer 140 may be configured to rotate with the inner pipe 120 to substantially separate at least the first and the second types of impurities from the working fluid. Alternatively, the stirrer 140 may be configured to rotate with the outer pipe 120 and the inner pipe 120 to substantially separate at least the first and the second types of impurities from the working fluid. In an embodiment, the stirrer 140 may be an impeller. The stirrer 140 may include blades 144, configured to stir the working fluid. In an embodiment, the blades 144 may be substantially formed in a hydrofoil profile. Further, the blades 144 may be composed of plastic, metal, composite, or the like. It may be apparent to a person ordinarily skilled in the art that the number, profile and composition of the blades 144 may vary.

In an embodiment, the filtration system 100 may include a motor 150 and a motor shaft 160. The motor shaft 160 may be coupled to the motor 150 with a mechanical fastener, such as screws. Alternatively, the motor shaft 160 may be coupled to the motor 150 using welding, soldering, adhesive glues and the like. The motor 150 may be an AC motor, a DC motor, or the like. As shown in FIG. 1, the motor 150 may be positioned proximate to the filter outlet 104. However, the motor 150 may be positioned separately at a distance from the filter outlet 104. In an embodiment, the motor 150 may be encased in a motor housing 170. The motor housing 170 may include suitable sealing means (E.g. O-rings) to substantially prevent the working fluid to contact the motor 150.

The motor 150 may be configured to rotate the stirrer 140 via the motor shaft 160. In an embodiment, the motor shaft 160 may be coupled with the inner pipe 120 such that the stirrer 140 rotates synchronously with the inner pipe 120 to substantially separate at least the first and the second types of impurities from the working fluid. Alternatively, the motor shaft 160 may be coupled to both the outer pipe 110 and the inner pipe 120 such that the outer pipe 110, the inner pipe 120 and the stirrer 140 may rotate synchronously. The motor shaft 160 may be coupled to the outer pipe 110 and the inner pipe 120 using welding, soldering, adhesive glue and the like. In an embodiment, the motor shaft 160 may be coupled to the stirrer 140 via a gear mechanism (not shown). The gear mechanism may enable rotation of the stirrer 140 at a speed different from the speed of the inner pipe 120. In yet another embodiment, the outer pipe 110, the inner pipe 120 and the stirrer 140 may be rotated through the motor shaft 160 via individual gear mechanisms so as to enable an asynchronous rotation of the outer pipe 110, the inner pipe 120 and the stirrer 140. In an alternative embodiment, the filtration system 100 may include a secondary motor (not shown) having a secondary motor shaft (not shown). The secondary shaft may be separately coupled to the stirrer 140 without coupling to the inner pipe 120. This separate coupling may enable the stirrer 140 to rotate at a speed different from the speed of the inner pipe 120. It may be apparent to a person ordinarily skilled in the art that the inner pipe 120 and the stirrer 140 may be rotated with various other configurations and at any different speeds.

Figure 2:
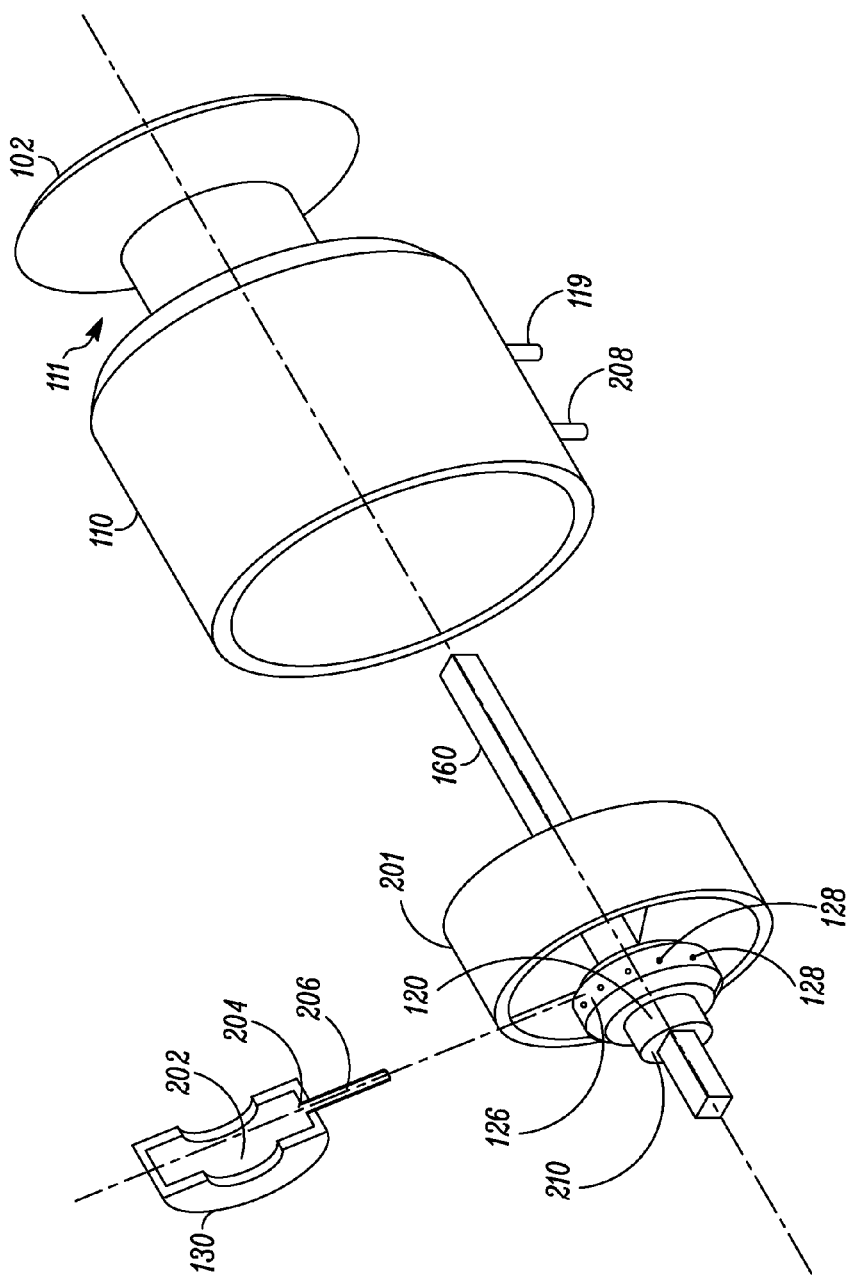
FIG. 2 illustrates different components of the filtration system, according to an embodiment.

FIG. 2 illustrates different components of the filtration system 100, according to an exemplary embodiment. In an embodiment, the outer pipe 110 may be composed of a plastic material. However, a person ordinarily skilled in the art may appreciate that any other material may be utilized in the composition of the outer pipe 110. In an embodiment, the filter inlet 102 may form an integral part of the outer pipe 110. In another embodiment, the outer pipe 110 and the filter inlet 102 may be separate components. In such case, the outer pipe 110 may be configured to form a sealed coupling with the filter inlet 102 such that the working fluid enters the filtration system 100 without substantially leaking out. In a further embodiment, O-rings may be utilized to form a seal between the filter inlet 102 and the outer pipe 110.

Further, in an embodiment, the collection chamber 126 may be integrally formed with the inner pipe 120. In another embodiment, the collection chamber 126 may be fixedly coupled with the inner pipe 120 to form a seal. O-rings may be utilized to form the seal between the collection chamber 126 and the inner pipe 120. The fixed coupling of the collection chamber 126 and the inner pipe 120 may enable a synchronous rotation of the collection chamber 126 and the inner pipe 120.

Further, the synchronous rotation of the collection chamber 126 with the inner pipe 120 causes the holes 128 to also synchronously rotate with the inner pipe 120. The rate of flow of the second type of impurity may be controlled based on a size of the holes. Further, the size of the holes 128 may not allow any solid impurity (if present) to pass through the holes 128 and clog any subsequent components. In an embodiment, the holes 128 may be positioned in multiple rows along the circumference of the collection chamber 126. In another embodiment, the holes 128 may be positioned in a staggered formation on the circumference of the collection chamber 126. However, it may be apparent to a person ordinarily skilled in the art that the holes 128 may be formed in various other configurations. In an embodiment, radius of the holes 128 may substantially be in the range of about 2 mm to 3 mm.

FIG. 2 also shows a sectional view of the tubular chamber 130 for illustrative purposes. In an embodiment, the outer pipe 110 may be slidably engaged with the inner pipe 120 through a rotating hub 201 (shown in FIG. 2). In an embodiment, an inner surface 202 of the tubular chamber 130 may be formed in a substantially curved shape to enable flow of the second impurity towards a bottom portion 204. The tubular chamber 130 includes a chamber outlet 206 present at the bottom portion 204 of the tubular chamber 130. The chamber outlet 206 may be configured to provide an outlet for the second type of impurity from the tubular chamber 130. The tubular chamber 130 may be immovably coupled with the outer pipe 110 such that the chamber outlet 206 remains in a predefined location enabling flow of the second type of impurity out of the tubular chamber 130. Further, the outer pipe 110 may include a second opening 208 configured to provide an opening for the chamber outlet 206 to expel the second type of impurity from the filtration system 100.

As shown in FIG. 2, the inner pipe 120 may be mounted on the motor shaft 160. Further, the motor shaft 160 may have a substantially rectangular cross-section to substantially prevent slippage between the motor shaft 160, and the inner pipe 120 and/or the stirrer 140. However, the motor shaft 160 may have any other cross-section. In an embodiment, motor shaft 160 may be fixedly coupled to the inner pipe 120 substantially proximate to an end 210 of the inner pipe 120. The motor shaft 160 may be attached to the inner pipe 120 via various means, such as but not limited to, adhesives, welding, brazing, mechanical fasteners, structural members or the like. The end 210 of the inner pipe 120 may be sealed to substantially prevent a leakage of the second type of impurity. In an embodiment, multiple coupling ribs (not shown) may fixedly couple the motor shaft 160 with the inner pipe 120. The coupling ribs may be integral with the inner pipe 120 or the motor shaft 160. The coupling ribs may extend radially outwards from the motor shaft 160 to attach the motor shaft 160 to the inner pipe 120. The fixed coupling may enable synchronous rotation of the inner pipe 120 and the motor shaft 160.

Figure 3:
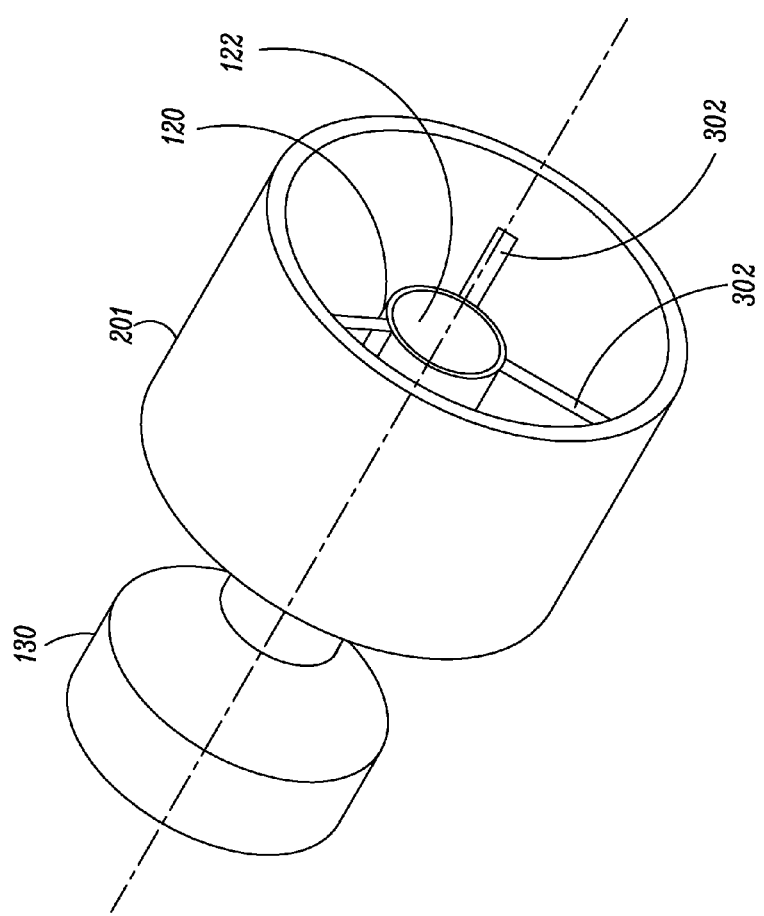
FIG. 3 illustrates a perspective view of an inner pipe of the filtration system, according to an embodiment.

FIG. 3 is a sectional perspective view of the inner pipe 120, according to an exemplary embodiment. As shown in FIG. 3, a radius of the inner pipe 120 may be substantially less than the radius of the outer pipe 110. As shown in FIG. 3, the inner pipe inlet 122 may be exposed to the flow of the working fluid downstream of the venturi neck 111. In an embodiment, the inner pipe inlet 122 may be substantially circular in shape. In a further embodiment, the radius of the inner pipe inlet 122 may be substantially in a range of about 5 to 10 mm and a length of the inner pipe 120 may be substantially in a range of about 30 mm to 50 mm.

As shown in FIG. 3, the rotating hub 201 may include multiple supporting members 302 configured to slidably couple the inner pipe 120 with the outer pipe 110. In an embodiment, the supporting members 302 may be radially extending ribs. The supporting members 302 may be fixedly coupled to the rotating hub 201 and the inner pipe 120.

In an embodiment, various components of the filtration system 100 may be integrally molded together using various molding methods, such as, but not limited to, injection molding, compression molding, or the like. However, it may be apparent to a person ordinarily skilled in the art that various other molding methods may be utilized.

During operation, the working fluid with impurities flowing from the appliance may be received through the filter inlet 102. In an embodiment, the outer pipe 110, the inner pipe 120 and the stirrer 140 may rotate synchronously to cause a centrifugal force to act on the working fluid. In another embodiment, the outer pipe 110 and the inner pipe 120 may rotate synchronously while the stirrer 140 may rotated at a different speed to cause centrifugal force to act on the working fluid. In a further embodiment, rotation of the stirrer 140 may also cause a downstream flow of the working fluid towards the filter outlet 104. The venturi neck 111 may create a constriction in the flow of the working fluid, thereby substantially increasing a rate of flow of the working fluid and enhancing churning of the working fluid as it comes out of diverging section 113. Accordingly, amount of the centrifugal force generated on the working fluid may be enhanced due to the flow of the working fluid from the venturi neck 111. Further, pressure difference developed in the outer pipe 110 due to the venturi neck 111 may assist in a smooth intake of the working fluid in the outer pipe 110.

Further, the centrifugal force may cause the first type of the impurity and the second type of impurity to be separated from the working fluid. Particularly, the first type of impurity, due to higher density, may be forced substantially towards the circumference of the outer pipe 110 and the second type of impurity may be forced towards a region proximate to the centre of the outer pipe 110. The first type of impurity may be received by the outlet channel 116, separating the first type of impurity from the working fluid. The outlet channel 116 may be connected to the first opening 119 of the outer pipe 110 through which the first type of impurity may be expelled from the filtration system 100.

Since the inner pipe 120 may be positioned co-axially with respect to the outer pipe 110, the second type of impurity may collect proximate to the inner pipe inlet 122 and enter the inner pipe 120. Subsequently, the second type of impurity enters the collection chamber 126, in which the flow of the second type of impurity may be controlled through the holes 128. The collection chamber 126 may rotate synchronously with the inner pipe 120. Consequently, the second type of impurity may flow radially out of the holes 128.

Thereafter, the second type of impurity may be collected by the tubular chamber 130. In an embodiment, the second type of impurity may impinge on the inner surface 202 and flow towards the chamber outlet 206. The chamber outlet 206 may be coupled to the second opening 208 of the outer pipe 110 through which the second type of impurity is expelled out of the filtration system 100. Thereafter, the working fluid separated from the first and the second type of impurity may flow out of the filter outlet 104 located downstream.

Various aspects of the techniques described above find utility in various types of dishwasher, washing machines, water purifiers and any household or industrial appliance that require separation of impurities from water. The filtration system may be particularly useful in appliances that recycle their used working fluid for usage in the next operational cycle.

A prime advantage, at least for some embodiments, over existing methods may be that the filtration system 100 does not require frequent component replacement. Further, degree of purification of the working fluid remains substantially constant over a period of time. Furthermore, the maintenance cost of filtration system 100 may be considerably lower than existing methods. Still further, the filtration system may not require additional power for its operation as the motor 150 may be replaced by a motor utilized by the appliance for its operation. Moreover, the filtration system may have an improved filtration efficiency compared to conventional filtration systems.

What is claimed is:

1. A filtration system comprising:
   an outer pipe configured to receive a working fluid from a filter inlet, and wherein the outer pipe comprises:
   a venturi neck located downstream of the filter inlet; and
   an outlet channel located downstream of the venturi neck, wherein the outlet channel is configured to provide an outlet for a first type of impurity comprising solid particles;
   an inner pipe co-axially positioned with the outer pipe, wherein the inner pipe is configured to receive a second type of impurity comprising oil; and
   a stirrer positioned inside the outer pipe, wherein the stirrer and the inner pipe rotate to substantially separate at least the first and the second types of impurities from the working fluid;
   wherein
   the outer pipe comprises a first opening configured to provide an opening for the outlet channel to expel the first type of impurity, and the inner pipe comprises a collection chamber.

2. The filtration system of claim 1, wherein the stirrer rotates synchronously with the inner pipe to substantially separate at least the first and the second types of impurities from the working fluid.

3. The filtration system of claim 1, wherein the stirrer, the outer pipe and the inner pipe rotate to substantially separate at least the first and the second types of impurities from the working fluid.

4. The filtration system of claim 3, wherein the stirrer rotates synchronously with the outer pipe and the inner pipe to substantially separate at least the first and the second types of impurities from the working fluid.

5. The filtration system of claim 1, wherein the first type of impurity having a first density associated therewith.

6. The filtration system of claim 1, wherein the second type of impurity having a second density associated therewith, and wherein the second density is lesser than the first density.

7. The filtration system of claim 1, wherein the stirrer is an impeller.

8. The filtration system of claim 1, wherein the filter system further comprises a motor and a motor shaft, and wherein the stirrer is mounted on the motor shaft.

9. The filtration system of claim 8, wherein the motor shaft comprises one of a square, circular and triangular cross-sectional area.

10. The filtration system of claim 1, wherein the stirrer is positioned proximate to the filter inlet.

11. The filtration system of claim 1, wherein the collection chamber comprises holes.

12. The filtration system of claim 11, further comprising a tubular chamber, wherein the tubular chamber substantially encases the collection chamber and wherein the tubular chamber receives the second type of impurity via the holes of the collection chamber.

13. The filtration system of claim 12, wherein the tubular chamber comprises a chamber outlet and wherein the chamber outlet is configured to provide an outlet for the second type of impurity.

14. The filtration system of claim 13, wherein the outer pipe comprises a second opening configured to provide an opening for the chamber outlet to expel the second type of impurity.

15. The filtration system of claim 1, wherein the working fluid is water.

16. The filtration system of claim 1, wherein the filtration system is used in at least one of dishwasher, water purifier and washing machine.

17. The filtration system of claim 1, wherein the outer pipe comprises a filter outlet configured downstream of the tubular chamber.

18. The filtration system of claim 1, wherein the filter inlet is positioned in a straight line with respect to a drain outlet of an appliance.

19. The filtration system of claim 1, wherein the filter inlet is configured substantially perpendicular with respect to the drain outlet of an appliance.

* * * * *